United States Patent [19]
Ziemek

[11] 3,807,044
[45] Apr. 30, 1974

[54] METHOD FOR MAKING HEATING MATS
[75] Inventor: Gerhard Ziemek, Hannover, Germany
[73] Assignee: Kabel-und Metallwerke Gutehoffhungshutte Aktiengesellschaft, Hannover, Germany
[22] Filed: Aug. 24, 1972
[21] Appl. No.: 283,519

[30] Foreign Application Priority Data
Sept. 4, 1971  Germany............................ 2144379

[52] U.S. Cl.................. 29/611, 156/177, 156/205, 219/542, 219/546, 219/548
[51] Int. Cl. ............................................. H05b 3/00
[58] Field of Search ...... 29/611; 219/542, 546, 548; 156/205, 177, 179

[56] References Cited
UNITED STATES PATENTS
3,010,007  11/1961  Theodore et al. .............. 156/177 X
3,069,522  12/1962  Jamison .......................... 219/546 X
3,730,803  5/1973  Morrison ............................ 156/205

Primary Examiner—Charles W. Lanham
Assistant Examiner—Victor A. DiPalma
Attorney, Agent, or Firm—Ralf H. Siegemund

[57] ABSTRACT

A process of manufacturing heating mats is disclosed wherein the support strips of a meandering heating conductor are respectively made from two strips; one of the latter strips is corrugated and the corrugation tool is used to press the two strips into contact with an adhesive in between, and together they are peeled off the corrugation tool. The adhesive is preferably heated just before joining the two strips and is cooled again immediately upon joining.

6 Claims, 4 Drawing Figures

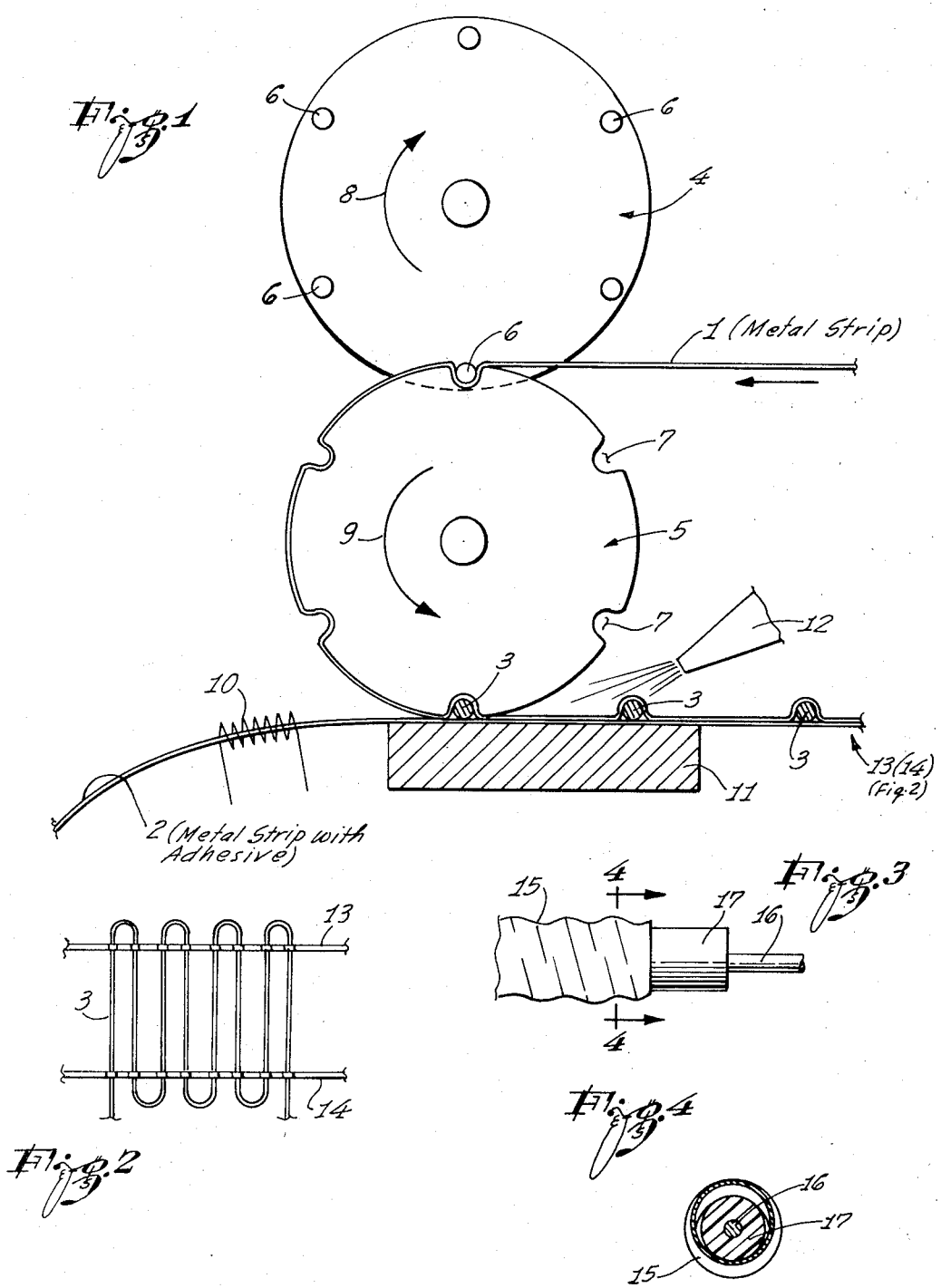

METHOD FOR MAKING HEATING MATS

BACKGROUND OF THE INVENTION

The present invention relates to a method for making a flat, areal heater such as a heating mat using an electrical conductor which runs in meandering loops. The mat to be made has the conductor supported by means of interconnected support strips which are affixed to the conductor from opposite sides; one of the strips must be provided with spaced apart corrugation grooves for receiving the conductor so that the loops thereof are maintained in position.

Heaters of the type referred to above are used increasingly for heating of houses, but also for heating roads and bridges (to clear them from ice). The heating conductor is often embedded in a material which serves readily as heat storage element; in other cases, the conductor is merely covered for protection. Generally, such areal heaters must be easy to install, easy to be transported and must maintain their shape even under load, before as well as after installation.

The German printed Pat. application No. 1,615,349 describes a heating mat of the type mentioned above, and the supporting metal strips therein are welded to each other. The particular mat has proven to be quite satisfactory as to both electrical operation and durability under strong mechanical wear. Moreover, the method of making such a mat is encumbered by the fact that welding requires a stop and go operation, so that the preceding assembly of the conductor and the support strips must likewise be run on an intermittent basis. The assembly line must usually stop for as long as is needed until the welding electrodes have provided a firm welding bond and can be removed.

DESCRIPTION OF THE INVENTION

It is an object of the present invention to suggest a process for manufacturing such heating mats on a continuous basis which does not require stop and go operations. In accordance with the preferred embodiment of the invention, it is suggested to provide at least one of the support strips with an adhesive on one side. Tooling which provides corrugation grooves causes also two strips to be squeezed together. The adhesive is preferably heated before run to the corrugating and squeezing device, and the adhesive is caused to harden when leaving that device. For example, air is blown against the bonded strips to cool the adhesive.

Thus, the invention offers the advantage of providing for a continuous bonding operation under utilization of a prepared bonding agent on one or both strips. A corrugating device is already provided for and can now be used additionally for urging the two strips against each other to obtain bonded structure. A stop and go operation is no longer needed. The corrugation tooling may include a drum or the like with recesses into which the strip is forced to obtain spaced apart corrugation grooves. Before the strip is peeled off the drum, the latter is used to press the strip against the other one, and they are then jointly peeled off that drum.

The U. S. letters Pat. No. 3,209,128 discloses already the bonding of support bars in heating mats, but these bars are made of plastic so that they do not produce a sufficiently stiff support. Moreover, this patent is silent as to the method to be used.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a somewhat schematic side view of equipment for practicing the invention;

FIG. 2 is a top elevation of a heating mat when made;

FIG. 3 is an enlarged view of a heating conductor used preferably for practicing the invention method; and FIG. 4 is a section view along lines 4—4 of FIG. 3.

DESCRIPTION OF THE DRAWINGS

Proceeding now to the detailed description of the drawings, FIG. 1 illustrates two steel strips 1 and 1 to be joined so as to establish a support bar and stiff strip such as 13 or 14 in FIG. 2, for a heating conductor 3. The meandering conductor 3 is shown in cross-section in FIG. 1. Strip 1 runs into a corrugating apparatus having disks 4 and 5. Disk 4 is provided with pins 6 which extend axially from the disk. Coacting disk 5 has grooves 7 along its periphery and acts as corrugating die.

As the two disks or drums 4 and 5 rotate in direction of the arrows, strip 1 is pulled into the space between the axially offset disks 4 and 5, and pins 6 force the strip into the grooves in strip 1. The corrugated strip 1 loops back and is thus held in abutment with drum 5.

The second strip involved, strip 2, is and remains flat and carries a layer of an adhesive such as a copolymer of ethylene. The strip is oriented so that the layer of adhesive faces strip 1. Strip 2 is heated by means of a heater 10 to soften the adhesive and render it tacky. For reasons of easy handling, the adhesive should be hard at room temperature having no tacky properties until heated or treated otherwise. The disk 5 in whose grooves the strip 1 has been pressed, advances the strip into contact with strip 2, there being a support table 11 against which both strips are pressed by the disk 5. Accordingly, strips 1 and 2 are bonded together and peeled off disk 5 jointly.

A nozzle 12 blows cold air against the strip immediately beyond the point of joining them so that the adhesive hardens readily and any subsequent wear on the strips finds them firmly interconnected. This is important, as the strips must not be amenable to separation as the mat may still run through other process equipment.

The particular kind of adhesive used as bonding agent is not subject to many specific requirements. Actually, all that is required is that it bonds the two strips firmly together and hardens readily thereafter. One can use, for example, araldite, or a bonding agent that is applied with a solvent. One can also use so-called two component adhesives in micro-escapsulated configuration, wherein the capsules break either upon application of heat, or upon applying pressure force (e.g. 5 against 11), or both. As stated above, the metal strips 1 and 2 are joined in the equipment to obtain the support elements 13 and 14 in FIG. 2. Actually, the equipment of FIG. 1 should be duplicated to make the two support elements in parallel steps.

The strips 1 and 2 envelope the heating element 3 and the corrugations define the position and distance of the meandering loops of the heating conductor. Normally, two such support elements 13 and 14 are sufficient, but if the loops are long, more than two support elements have to be made. The heating conductor 3 is run into the equipment shown in FIG. 1 and is laid into the grooves in strip 1 before bonding to strip 2. The positioning equipment for conductor 3 is not of immediate interest here. Actually, the conductor 3 could be placed into the grooves by hand.

The particular construction of the heating conductor is not of immediate importance for practicing the principle steps of the invention method. However, it was found that a particularly constructed heating conductor is better suited than others.

As shown in FIGS. 3 and 4, it is advisable to use a heating conductor which includes a resistive core material 16 covered by an insulating lining or envelope 17 which in turn is jacketed in a corrugated metal tube 15. This kind of clad heating conductor is particularly resistive to any tendency to change its shape so that the mat retains its configuration also transversely to the extension of the support elements 13 and 14.

As was mentioned in the introduction, both strips could be provided with an adhesive. However, it can be seen that the pins 6 act directly on the side of strip 1 which will adhere to strip 2. Thus, the pins will act directly on the adhesive. Therefore, pins 6 will have to be cleaned continuously. While this is not impossible, it is somewhat inconvenient to do so.

The principle advantage of the invention is to be seen in that the corrugating apparatus is used also as pressing tool for the two strips, so that the use of an adhesive does not require any additional tooling here to join the strips. Corrugating and strip joining are both continuous processes so that stop and go procedure is not necessary.

It should be mentioned further, that in view of the employment of metal strips, heater 10 may be an inductive heater. Alternatively, the adhesive on strip 2 may be heated by blowing hot air against it, or through a resistive heater or the like.

The invention is not limited to the embodiments described above but all changes and modifications thereof not constituting departures from the spirit and scope of the invention are intended to be included.

I claim:

1. Method of making a heating mat using a heating conductor which runs in meandering loops comprising the steps of:
   providing first and second metal strips, at least one of the strips carrying an adhesive;
   corrugating the first strip in individual spaced apart locations, using a continuously working corrugating tool;
   inserting the conductor in the corrugations so that the loops extend transversely to the extension of the first strip;
   running the second strip to the corrugating tool at a location where the first strip is about to run off the tool with inserted conductor, so that the tool forces the two strips into intimate contact with each other with the adhesive being sandwiched in between for bonding the two strips together; and
   providing for accelerated hardening of the adhesive where the two bonded strips leave the tool.

2. Method as in claim 1, wherein the second strip carries adhesive, and including the step of heating the adhesive, the hardening step being a cooling step.

3. Method as in claim 2, wherein the adhesive is heated through inductive heating of said second strip.

4. Method as in claim 2, wherein a copolymer of ethylene is used as adhesive.

5. Method as in claim 2, wherein araldite is used as adhesive.

6. Method as in claim 1, wherein the corrugating tool used temporarily holds the corrugated strip and urges the first strip against the second strip on a pressure plate.

* * * * *